(12) United States Patent
May

(10) Patent No.: US 8,667,863 B2
(45) Date of Patent: Mar. 11, 2014

(54) FOOT CRADLE APPARATUS OF A MUSCLE TRAINING DEVICE

(75) Inventor: Christian May, Constance (DE)

(73) Assignee: medica-Medizintechnik GmbH, Hochdorf (DE)

( * ) Notice: Subject to any disclaimer, the term of this patent is extended or adjusted under 35 U.S.C. 154(b) by 204 days.

(21) Appl. No.: 13/045,863

(22) Filed: Mar. 11, 2011

(65) Prior Publication Data

US 2011/0154943 A1 Jun. 30, 2011

Related U.S. Application Data

(63) Continuation of application No. PCT/DE2010/000412, filed on Apr. 10, 2010.

(30) Foreign Application Priority Data

Jun. 18, 2009 (DE) .......................... 10 2009 029 755

(51) Int. Cl.
*G05G 1/60* (2008.04)

(52) U.S. Cl.
USPC ............................... 74/564; 74/594.6; 482/57

(58) Field of Classification Search
USPC .......... 74/564, 594.4, 594.6, 594.7, 540, 575, 74/577 S, 578, 527; 601/29, 32, 36; 482/56, 80, 57; 24/505; 280/291, 748, 280/801.2, 802; 297/486, 487, 488; 36/131
IPC ....................................................... B62M 3/08
See application file for complete search history.

(56) References Cited

U.S. PATENT DOCUMENTS

| | | | |
|---|---|---|---|
| 493,696 A | 3/1893 | Ferguson | |
| 605,536 A | 6/1898 | Brice | |
| 620,291 A * | 2/1899 | Erickson | 74/594.6 |
| 1,775,988 A * | 9/1930 | Custer | 297/183.4 |
| 2,565,348 A * | 8/1951 | Brockman et al. | 601/36 |
| 2,680,021 A * | 6/1954 | Sbarra | 482/65 |
| 2,851,900 A * | 9/1958 | Powell | 74/542 |
| 3,640,572 A * | 2/1972 | Doehler | 297/488 |
| 4,057,220 A * | 11/1977 | Kudlacek | 254/376 |
| 4,103,563 A * | 8/1978 | Genzling | 74/594.5 |
| 4,458,910 A * | 7/1984 | Stillwagon | 280/291 |
| 4,809,563 A * | 3/1989 | Loppnow | 74/594.6 |

(Continued)

FOREIGN PATENT DOCUMENTS

FR 396 563 A 4/1909
FR 2 876 657 A1 4/2006

*Primary Examiner* — Thomas Diaz

(74) *Attorney, Agent, or Firm* — Muncy, Geissler, Olds & Lowe, P.C.

(57) ABSTRACT

A foot cradle apparatus of a muscle training device is provided, having a foot cradle with a tread and a side wall at least partially limiting the tread, and a fixation unit for fixing a human foot in the foot cradle. A foot fixation unit that is simple to handle and has small dimensions and a low weight is created in that the fixation unit is formed as a lockable, pivotable bracket, whose pivot bearing has a pivot axis oriented substantially parallel to the longitudinal axis of the foot cradle and is provided in a compact bearing unit which is connected fixedly at least indirectly to the foot cradle and which is attached to an inner side wall, close to the inner side of a patient's foot, of the foot cradle and is connected fixedly to the tread via the inner side wall.

17 Claims, 3 Drawing Sheets

(56) References Cited

U.S. PATENT DOCUMENTS

| | | | |
|---|---|---|---|
| 5,284,131 A * | 2/1994 | Gray | 601/36 |
| 5,456,138 A | 10/1995 | Nutile et al. | |
| 5,848,955 A * | 12/1998 | Gooch et al. | 482/57 |
| 6,957,821 B2 * | 10/2005 | Gorman et al. | 280/291 |
| 7,954,400 B2 * | 6/2011 | Lee | 74/594.4 |

* cited by examiner

FOOT CRADLE APPARATUS OF A MUSCLE TRAINING DEVICE

This nonprovisional application is a continuation of International Application No. PCT/DE2010/000412, which was filed on Apr. 10, 2010, and which claims priority to German Patent Application No. DE 10 2009 029 755.3, which was filed in Germany on Jun. 18, 2009, and which are both herein incorporated by reference.

BACKGROUND OF THE INVENTION

1. Field of the Invention

The present invention relates to a foot cradle apparatus of a muscle training device, having a foot cradle with a tread and a side wall, at least partially limiting the tread, and a fixation units for fixing a human foot in the foot cradle.

2. Description of the Background Art

Foot cradle apparatus are used in the conventional art to connect releasingly and fixedly the feet of a patient performing muscle training to the elements of a muscle training device, which are provided for force application to be made via the feet in the training device. Prior-art foot cradle apparatus have the disadvantage, however, that for the purpose of fixing an inserted foot they require pivoting devices that are bulky, heavy, elaborate in construction, and cumbersome to handle during the fixation of a foot.

SUMMARY OF THE INVENTION

It is therefore an object of the present invention to provide a foot fixation device for a foot cradle apparatus of a muscle training device, the apparatus having small dimensions and a low weight that is simple to handle.

For a foot cradle apparatus of the aforementioned type, the object is achieved according to an embodiment of the invention in that the fixation unit is formed as a lockable, pivotable bracket, whose pivot bearing has a pivot axis oriented substantially parallel to the longitudinal axis of the foot cradle and is provided in a compact bearing unit, which is connected fixedly at least indirectly to the tread and which is attached to an inner foot cradle side wall, close to the inside of a patient's foot, and is connected fixedly to the tread via the inner side wall.

In an embodiment of the apparatus, the fixation unit can be formed as a lockable, pivotable bracket, whose pivot bearing has a pivot axis substantially parallel to the longitudinal axis of the foot cradle and is provided in a compact bearing unit, which is fixedly connectable at least indirectly to the tread and which is attached to a foot cradle inner side wall, close to the inside of a patient's foot, and is fixedly connectable to the tread via the inner side wall. It is achieved that a foot of a user, on the one hand, can be fixed releasably especially quickly and effectively in the area of a foot cradle and, on the other, can be released also especially quickly from the area of a foot cradle, whereby the fixation unit formed by the bracket is very light in terms of weight with easy accessibility on the part of a user and can be accommodated with the saving of space in the area of the foot cradle, whose pivot bearing has a pivot axis oriented parallel to the longitudinal axis of the foot cradle.

According to an embodiment of the apparatus of the invention, it is provided that the bracket can be formed curved concavely in the direction of a top side of a foot placed on the tread.

According to another embodiment of the apparatus of the invention, it is provided that the pivot bearing of the bracket can be formed to assure a releasable locking over a predefined pivot range. In this regard, a catch unit having locking toothing can be provided to assure a releasable locking over the predefined pivot range.

The pivot range can be designed to comprise an angle range of at least 80° starting from a position of the bracket directly above the surface of a foot placed in the foot cradle.

According to an embodiment of the apparatus of the invention, it is provided that the entire bearing unit can be arranged in the interior of the foot cradle. The entire bearing unit can be made so narrow that movement of a foot placed in the interior of the foot cradle is only insignificantly restricted by the bearing unit.

The side wall can be made curved as a single piece and can surround the foot at least in the area of the heel and the sides of the feet.

The bracket of the apparatus of the invention can be moved from a first position, in which the foot cradle is opened for a positioning of a foot on the tread, against the force of a spring reversibly to a lockable second position, in which the foot is held trapped via the bracket in the foot cradle, whereby the bracket is pretensioned by the spring in order to pivot back from a second position to the first position when the locking is released.

According to another embodiment of the apparatus of the invention, it is provided that one end of the bracket in the pivot bearing can be connected to a rotatably mounted disk, which is toothed in the area of its outside surface and whose teeth work together with an edge of a pin, which is pretensioned by a spring, to lock the disk in a second position.

The edge can be formed on a projection of the pin.

The pin can be positioned in the bearing unit preferably slidable reciprocally and linearly and thereby against the force of the spring, in order to remove the edge from engagement with a tooth of the disk, to release the bracket from locking in a second position.

Preferably, to release the bracket from locking in a second position, a lever is provided whose free first end is to be actuated manually and whose second end, opposite to the first end, works together with the pin, to move the pin against the force of the spring. The second end of the lever in this case can be applied at a projection provided on the pin.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
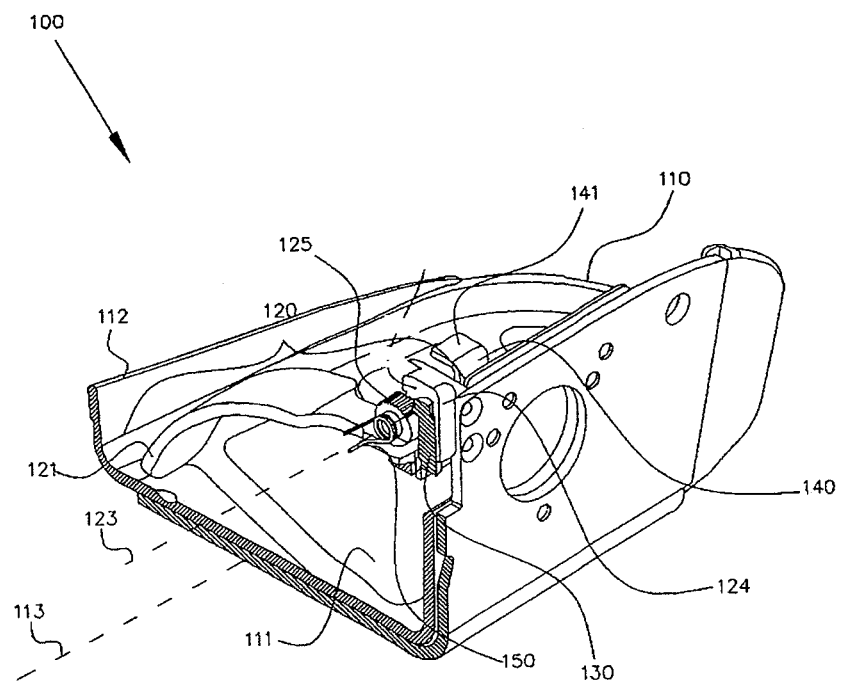
FIG. 1 shows a preferred embodiment of the apparatus of the invention in a view oblique from above.
Figure 2:
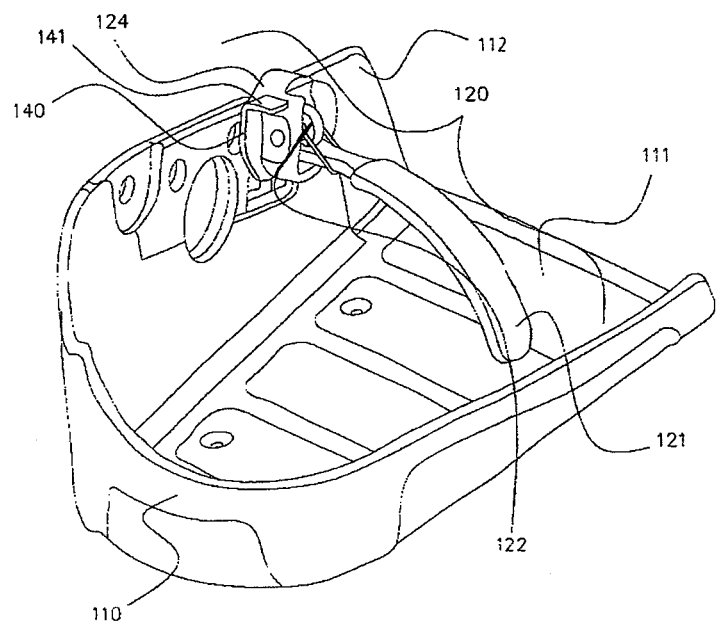
FIG. 2 shows a preferred embodiment of the apparatus of the invention in a view oblique from above.
Figure 3:
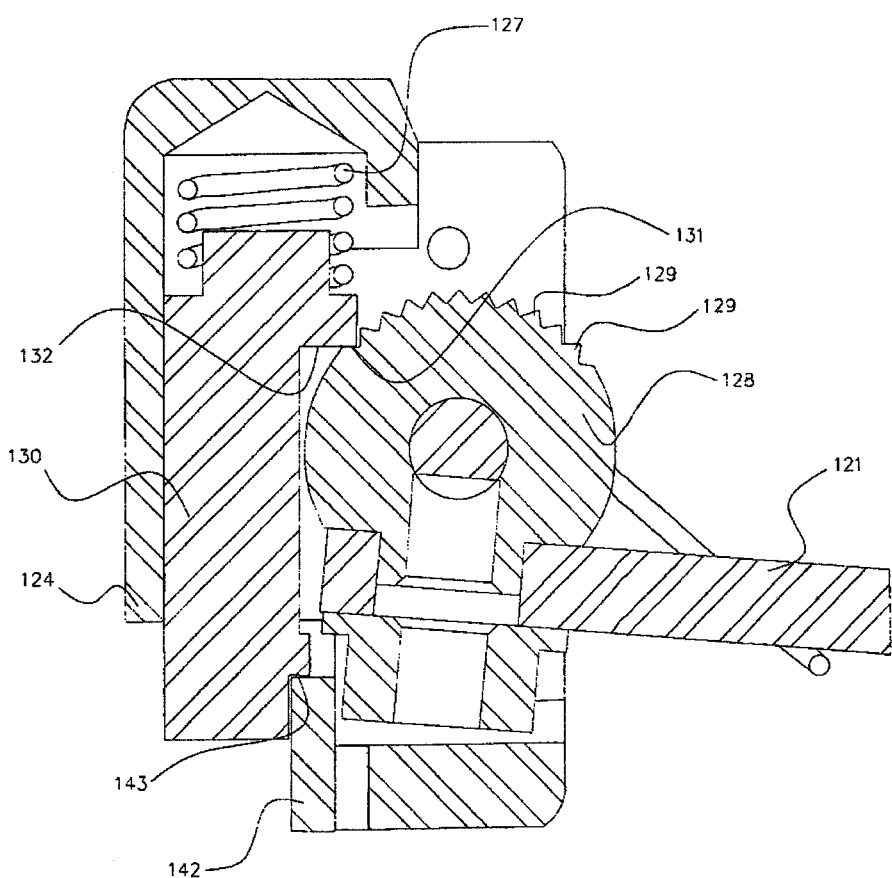
FIG. 3 shows the preferred embodiment, shown in FIG. 1, of the apparatus of the invention in a cross-sectional view.

A foot cradle apparatus 100, which is illustrated in FIGS. 1 and 3, of a muscle training device contains a foot cradle 110, with a tread 111 and a side wall 112 at least partially limiting tread 111, and a fixation unit 120 for fixing a human foot in the foot cradle 110, whereby fixation unit 120 is formed as a lockable, pivotable bracket 121, which is curved concavely in the direction of the top side of a foot placed on tread 111 and whose pivot bearing 122 has a pivot axis 123 oriented substantially parallel to the longitudinal axis 113 of foot cradle 110.

Pivot bearing 122 is provided in a bearing unit 124 indirectly fixedly connected to tread 111, the bearing unit which is attached to a side wall 112 of foot cradle 110 and is fixedly connected to tread 111 via side wall 112. Side wall 112 is made curved as a single piece and surrounds the foot in the area of the heel and the sides of the feet.

Pivot bearing 122 of bracket 121 is formed to assure a releasable locking over a predefined pivot range, whereby for the purpose of a releasable locking over the predefined pivot range a catch unit having a locking toothing 125 is provided.

The pivot range comprises an angle range spanning about 90° starting from a position of the bracket 121 directly above the surface of a foot placed in the foot cradle.

The entire bearing unit 120 is arranged in the interior of foot cradle 110 and is thereby formed so narrow that movement of a foot placed in the interior of foot cradle 110 is only insignificantly restricted by bearing unit 120.

Bracket 121 can be moved from a first position, in which foot cradle 110 is opened for positioning of a foot on tread 111, against the force of a spring 150 reversibly to a lockable second position in which the foot is held trapped by means of the bracket 121 in the foot cradle 110, whereby bracket 121 is pretensioned by spring 150 in order to pivot back from a second position to the first position when the locking is released.

One end of the bracket 121 in the pivot bearing 122 is connected to a rotatably mounted disk 128 (illustrated in FIG. 3), which is toothed in an area of its outside surface and whose teeth 129 worked together with an edge 131 of a pin 130, which is pretensioned by means of a spring 127, in order to lock the disk 128 in a second position. The edge 131 in this case is formed on a projection 132 of the pin 130.

The pin 130 is positioned in the bearing unit 124 slidable reciprocally and linearly and movable against the force of the spring 127, in order to remove edge 131 from engagement with a tooth 129 of disk 128, to release bracket 121 from locking in a second position.

A lever 140, whose free first end 141 is to be actuated manually and whose second end 142, opposite to the first end 141, works together with the pin 130, is provided to move the pin 130 against the force of the spring 127 in order to release the bracket 121 from locking in a second position. For this purpose, the second end 142 of the lever 140 is applied at a projection 143 provided on pin 130.

The exemplary embodiment of the invention explained heretofore only serves the purpose of a better understanding of the teaching according to the invention defined by the claims, which is not limited as such by the exemplary embodiment.

What is claimed is:

1. A foot cradle apparatus of a muscle training device, the apparatus comprising:
   a foot cradle having a tread and a side wall, the side wall partially limiting the tread; and
   a fixation unit configured to fix a human foot in the foot cradle, the fixation unit being formed as a lockable and pivotable bracket, whose pivot bearing has a pivot axis oriented substantially parallel to a longitudinal axis of the foot cradle, the fixation unit being arranged on a bearing unit that is fixedly connectable, at least indirectly, to the foot cradle, the bearing unit being attached to an inner portion of the side wall of the foot cradle,
   wherein the bracket is configured to be moved from a first position, in which the foot cradle is opened, against the force of a first spring reversibly to a lockable second position, in which the foot cradle is closed, and
   wherein the bracket is pre-tensioned by said first spring to pivot back from the second position to the first position when the locking is released.

2. The apparatus according to claim 1, wherein the bracket is formed curved concavely in a direction of the tread.

3. The apparatus according to claim 1, wherein the pivot bearing of the bracket is releasably lockable over a predefined pivot range.

4. The apparatus according to claim 3, wherein a catch unit having locking toothing is provided for releasable locking over the predefined pivot range.

5. The apparatus according to claim 3, wherein the pivot range comprises an angle range of at least 80°.

6. The apparatus according to claim 1, wherein the bearing unit is entirely arranged in the interior portion of the foot cradle.

7. The apparatus according to claim 1, wherein the side wall surrounds a rear heel portion and sides of the foot cradle.

8. The apparatus according to claim 1, wherein the side wall is formed curved as a single piece.

9. The apparatus according to claim 1, wherein one end of the bracket in the pivot bearing is connected to a rotatably mounted disk, which is toothed in an area of its outside surface and whose teeth work together with an edge of a pin that is pretensioned by a second spring to lock the disk in said second position.

10. The apparatus according to claim 9, wherein the edge of said pin is formed on a projection of the pin.

11. The apparatus according to claim 9, wherein the pin is positioned in the bearing unit slideable reciprocally and linearly.

12. The apparatus according to claim 9, wherein the pin is movable against the force of said second spring, in order to remove the edge from engagement with a tooth of the disk, to release the bracket from locking in a second position.

13. The apparatus according to claim 12, wherein a lever is provided whose free first end is to be actuated manually and whose second end, which is opposite to the first end, works together with the pin to thereby move the pin against a force of the spring in order to release the bracket from locking in the second position.

14. The apparatus according to claim 13, wherein the second end of the lever is applied at a projection provided on the pin.

15. The apparatus accordingly to claim 14, wherein said projection is formed on a side portion of said pin.

16. The apparatus according to claim 10 wherein said projection is formed on a side portion of said pin.

17. The apparatus according to claim 1, wherein one end of the bracket in the pivot bearing is connected to a rotatably mounted disk, which is toothed in an area of its outside surface and whose teeth work together with an edge of a pin that is pre-tensioned by a second spring to lock the disk in said second position, said pin positioned in the bearing unit to be slideable reciprocally and linearly, where the pin is movable against the force of the second spring to remove the edge of said pin from engagement with a tooth of the disk to release the bracket from locking in said second position, wherein a lever is provided having a first free end manually actuatable and a second end opposite of said first free end which second end is engageable with a projection on said pin to move said pin against the force of said second spring to release the bracket from locking in the second position.

* * * * *

UNITED STATES PATENT AND TRADEMARK OFFICE
CERTIFICATE OF CORRECTION

PATENT NO. : 8,667,863 B2
APPLICATION NO. : 13/045863
DATED : March 11, 2014
INVENTOR(S) : Christian May It is certified that error appears in the above-identified patent and that said Letters Patent is hereby corrected as shown below:

On the Title Page:

Item (75) Inventor: Christian May, Konstanz (DE)

Should read: Christian May, Constance (DE)

Signed and Sealed this
Twentieth Day of May, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,667,863 B2 | |
| APPLICATION NO. | : 13/045863 | |
| DATED | : March 11, 2014 | |
| INVENTOR(S) | : Christian May | |

It is certified that error appears in the above-identified patent and that said Letters Patent is hereby corrected as shown below:

On the Title Page:

Item (75) Inventor:     Christian May, Constance (DE)

Should read:     Christian May, Konstanz (DE)

This certificate supersedes the Certificate of Correction issued May 20, 2014.

Signed and Sealed this
Ninth Day of September, 2014

Michelle K. Lee
*Deputy Director of the United States Patent and Trademark Office*